United States Patent
Canello et al.

(10) Patent No.: US 10,981,818 B2
(45) Date of Patent: Apr. 20, 2021

(54) OUTDOOR APPARATUS AND METHODS TO TREAT WASTES, WASTEWATER AND CONTAMINATED WATER BODIES

(71) Applicants: Nicolas Canello, Alta Loma, CA (US); Nidia Yamileth Lopez-Canello, Alta Loma, CA (US)

(72) Inventors: Nicolas Canello, Alta Loma, CA (US); Nidia Yamileth Lopez-Canello, Alta Loma, CA (US)

( * ) Notice: Subject to any disclaimer, the term of this patent is extended or adjusted under 35 U.S.C. 154(b) by 137 days.

(21) Appl. No.: 16/004,384

(22) Filed: Jun. 9, 2018

(65) Prior Publication Data
US 2020/0017387 A1 Jan. 16, 2020

Related U.S. Application Data

(60) Provisional application No. 62/526,189, filed on Jun. 28, 2017.

(51) Int. Cl.
*C02F 3/30* (2006.01)
*C02F 3/00* (2006.01)
*C02F 3/34* (2006.01)

(52) U.S. Cl.
CPC .............. *C02F 3/301* (2013.01); *C02F 3/006* (2013.01); *C02F 3/308* (2013.01); *C02F 3/343* (2013.01); *C02F 2003/001* (2013.01); *C02F 2201/002* (2013.01)

(58) Field of Classification Search
USPC .................. 210/601, 610–612, 500.1, 497.2; 435/262.5, 289.1–297.3
See application file for complete search history.

(56) References Cited

U.S. PATENT DOCUMENTS

| | | | | |
|---|---|---|---|---|
| 4,623,464 A | * | 11/1986 | Ying | C02F 3/1263 210/616 |
| 5,366,891 A | * | 11/1994 | Premuzic | B09B 3/0016 423/1 |
| 5,531,898 A | * | 7/1996 | Wickham | C02F 3/34 210/606 |
| 5,639,658 A | * | 6/1997 | Drobish | C07K 14/475 435/243 |
| 5,840,182 A | * | 11/1998 | Lucido | C02F 3/006 210/202 |

(Continued)

FOREIGN PATENT DOCUMENTS

CA 2368407 7/2003

*Primary Examiner* — Nina Bhat

(57) ABSTRACT

The technology relates to an apparatus, methods and applications to grow microorganisms on-site to treat contaminated environments. The apparatus is designed to function under a wide range of environmental conditions including extreme cold, extreme heat and direct exposure to sunlight. Such environments normally reduce the shelf-life of the organisms in the storage chamber that feeds the fermenter where they are being grown. These environments can also lower the growth rate of the organisms in the fermenter causing diminished cell output. Quite often the optimum point of application for the organisms is outdoor and too far from structures with appropriate protection from ultraviolet radiation from the sun or from excessive cold or hot weather. The technology in the application addresses these issues.

7 Claims, 4 Drawing Sheets

(56) References Cited

U.S. PATENT DOCUMENTS

| | | | | |
|---|---|---|---|---|
| 6,335,191 B1 * | 1/2002 | Kiplinger | ............... | C12M 41/40 |
| | | | | 435/252.1 |
| 6,383,379 B1 * | 5/2002 | Choi | ........................ | C02F 3/12 |
| | | | | 210/195.3 |
| 6,402,941 B1 * | 6/2002 | Lucido | .................... | C02F 3/006 |
| | | | | 210/105 |
| 6,790,355 B2 * | 9/2004 | Shaffer | ..................... | B09C 1/10 |
| | | | | 210/205 |
| 7,300,583 B1 * | 11/2007 | Heppenstall | ............ | C02F 1/686 |
| | | | | 210/205 |
| 7,521,203 B2 * | 4/2009 | Lin | ........................ | C12M 41/26 |
| | | | | 435/41 |
| 7,615,156 B2 * | 11/2009 | Lenger | .................... | C02F 3/101 |
| | | | | 210/150 |
| 7,658,851 B2 * | 2/2010 | Nelson | ...................... | C02F 3/34 |
| | | | | 210/615 |
| 7,879,593 B2 * | 2/2011 | Whiteman | ................ | C02F 3/12 |
| | | | | 435/262 |
| 8,052,873 B1 * | 11/2011 | Foster | ..................... | C02F 3/348 |
| | | | | 210/195.1 |
| 9,783,438 B2 * | 10/2017 | Whiteman | ........... | H05K 999/99 |
| 10,322,956 B2 * | 6/2019 | Whiteman | ........... | H05K 999/99 |
| 2003/0215934 A1 * | 11/2003 | Rothweiler | ............... | B08B 7/00 |
| | | | | 435/262.5 |

* cited by examiner

| Location of Calibrated Thermometer | Temperature |
|---|---|
| Thermometer directly exposed to sunlight | 129° F |
| Thermometer inside of HDPE tank with no coating | 126° F |
| Thermometer inside of HDPE tank with heat-reflective coating | 102° F |

FIG. 4

OUTDOOR APPARATUS AND METHODS TO TREAT WASTES, WASTEWATER AND CONTAMINATED WATER BODIES

RELATED APPLICATIONS

The present patent application claims the benefits of priority of U.S. Provisional Patent Application No. 62/526,189 with the title "Outdoor Apparatus and Methods to Treat Wastes, Wastewater and Contaminated Water Bodies On-site" filed on Jun. 28, 2017, which is herein incorporated by reference in its entirety.

BACKGROUND

Bioaugmentation is the application of microorganisms to an environment to degrade contaminants through digestion. The biological degradation of such contaminants by the applied microorganisms is called bioremediation. Contaminated waters, soil or biosolids are bioremediated using microorganisms such as bacteria or fungi which digest contaminants. These products are sold as dormant or stabilized cultures. Such products are sold in powder, pellets, liquid or in gel form. In all cases, the cells have to be placed in a state of dormancy that is known by those in the arts of bioremediation. This dormancy process is necessary to provide shelf life to products sold in containers. The various dormancy processes kill a large percentage of the microorganisms. As much as half or more of the culture cells can be lost during the dormancy process.

In addition, commercially sold products have many high costs associated with them such as manufacturing, labor, process control, dormancy methods, dilution, standardization methods to maintain consistent viable cells, packaging and freight of diluted products. Even though powder products can contain desiccated microorganisms in spore form or in vegetative form (whole cells), these products have the additional cost of controlled dehydration of cells under rigorous conditions to reduce cell death. Pelletized products have the additional cost of pelletizing.

Liquid commercial products can be sold as spores or in vegetative form (whole cells). Liquid spore products normally have better shelf life than vegetative products because spores are in complete dormancy and the thick walls of the spores protect the cells. Liquid spore products are normally sold at concentrations that range from 0.1 billion cells per milliliter to 1 billion cells per milliliter (a.k.a. cell forming units or cfu). In addition to the costs mentioned before, liquid spore products have two significant disadvantages. The first disadvantage is that not all microorganisms used in bioremediation produce spores. A great number of microorganisms used in bioremediation exist in vegetative form only. This greatly limits the microorganism species that can be used and reduces the efficiency and scope to degrade contaminants in various types of environments. The second major disadvantage is that spores could take hours to come out of dormancy before they germinate into active vegetative cells. Conditions of the environment where the product is applied such as temperature, oxygen level, pH, types of nutrients etc. can slow germination. The spores can be washed away such as in the case of applications in the sewer or in wastewater treatment systems with short detention time. Even when they germinate, it takes time before they begin to reproduce themselves. Delay in germination may cause the microorganisms to reproduce themselves only a few times during the detention time in the contaminated environment.

There are commercial liquid products that contain vegetative cells. The vegetative cells can be cells that only can exist in vegetative form or hey can be cells from germinated spores which are used in the liquid-vegetative-cell product. These types of products also suffer from the same costly issues mentioned previously. Some products that are fully dormant in vegetative form need to undergo very severe dormancy methods that kill a large amount of the cells in the batch. Also, some of the chemicals used in the dormancy process can produce powerful-undesirable pungent odors. Other liquid vegetative products are in a semi-dormant state. These products are sold diluted and normally contain 0.1 to 0.2 billion cells per milliliter (cfu). The reason for this low cell concentration is that these semi-dormant bacteria are stored with some nutrients to keep them alive. The concentration of microorganisms and nutrients cannot be too high because the microorganisms would become active. If they become active, the container would become bloated with gases produced during metabolism and the microorganisms would die when nutrients run out reducing shelf life. Finally, care must be taken with these semi-dormant products during usage because if the container is opened and it is not fully used, it has the risk of becoming contaminated by pathogens from the environment which would grow at the expense of the nutrients in the product. This poses a danger for people handling a contaminated product.

Bioremediation products can also be sold in gel blocks or gel cylinders. These products dissolve gradually in the environment where they are used. The microorganisms in these products are in spore form because heat is needed to solidify the gel and if vegetative microorganisms are used, they would die with the heat. The gel also contains antimicrobial products to prevent the spores from activating and begin to grow prematurely inside the gel. Antimicrobial products would also kill vegetative cells in the gel if they were used. For these reasons, gel products suffer from the same disadvantages of other spore products such as limited available species and time needed to germinate. Finally, gel blocks or cylinders have additional costs of manufacturing and handling processes associated with them.

There are some applications where microorganisms are grown on the site of application using a bioreactor. A storage chamber for the microorganism and nutrients feeds a fermentation tank. The microorganisms multiply in the fermentation chamber many times before they are applied to the contaminated environment for bioremediation. This type of application offers the advantage that the microorganisms are not dormant when they are applied. It also offers the advantage that spores as well as vegetative species can be used. In addition, there are significant savings in manufacturing, process control, dilution, standardization, packaging, shipment etc. However, if the bioreactor is not inside a building or in an enclosure it is exposed to the environment. Direct sunlight can cause cell death in the storage chamber and in the fermenter. Excessive heat can also kill microorganisms in the storage chamber and in the fermenter. Normally the temperature on the surface of an object exposed to direct sunlight can be as much as 36 F or more than the recorded temperature for the area.

Additionally, when a bioreactor is exposed to outdoor environments, extreme cold weather can overpower the heating element of the fermentation chamber causing it to cool. Low temperature in the fermentation chamber can significantly reduce the cell count produced by the bioreactor. Quite often the ideal place to apply bioaugmentation is at the point where wastewater enters the plant (headworks) This point of application allows the entire plant to benefit from the application and permits the microorganisms to begin to work early on in the process. Often, space is limited at the headworks and there is not enough room to build an enclosure to protect a bioreactor from environmental temperature. For safety reasons there needs to be enough working space for employees to do their daily work. In other occasions bioaugmentation needs to be applied in a manhole in the sewer line to reach the desired portions of the sewer. Space can be limited depending on the location of the manhole where the application would take place and an enclosure with controlled temperature could be unsafe or not possible.

There is a need for an on-site bioreactor system that offers all the advantages of a bioreactor but that it can also be used outdoors exposed to the environment and function at its optimal potential without the need of an enclosure.

BRIEF SUMMARY

The present patent application relates to an outdoor cultivation system for bacteria, fungi or actinomycetes in a bioreactor that is placed on-site at the location of a contaminated environment. The microorganisms degrade the contaminants in the environment through digestion. The microorganisms used in the art of bioremediation are safe and efficient degrading various types of contaminants. A customized formulation can be prepared to degrade a wide range of contaminants at the same time. Contaminated environments differ in pH, temperature, nutrient levels, salinity, presence of bacterial inhibitors, availability or lack of oxygen etc. The microorganisms can be selected so that they are able to prosper in the environment where they would be applied.

The present patent application has advantages over other bioreactor systems. It has features that allow the growth of microorganisms outdoors efficiently under various environmental conditions such as extreme heat, extreme cold or direct intense sunlight. Quite often the location where the microorganisms need to be applied is not near a building or enclosure that can provide protection from extreme temperature or sunlight. In addition, an enclosure is often not practical nor possible because it occupies extra space. Often the point of application of bioaugmentation microorganisms to achieve the best results is early on in the entrance of a wastewater plant. In other occasions bioaugmentation needs to be applied in the sewer line to digest contaminant build-ups such as of fat, oil, grease, paper and debris. Quite often free space is limited in such places and equipment enclosures may become a safety hazard for workers.

High temperatures (104 F or above) and ultraviolet radiation from direct sunlight are detrimental for the growth of microorganisms. For these reasons, the bioreactors are often enclosed away from such environments to ensure efficient growth.

Microorganisms in the storage chamber are also affected by high heat and even constant ultraviolet radiation from sunlight. Many vegetative species (microorganisms that do not produce spores) which are very useful such as pseudomonas, paracoccus, nitrobacter, nitrosomas, thiobacillus and others are very sensitive to high heat and ultraviolet radiation from sunlight. Exposure to heat and even low levels of ultraviolet radiation in the storage chamber causes loss of viability of the microorganisms fed to the fermentation chamber. Additionally, exposure of excessive heat and ultraviolet radiation also causes low cell count during fermentation. The result is a low cell count of the microorganisms applied to the contaminated environment.

On the other hand, if the weather is extremely cold and overpowers the heating element in the fermentation chamber, it slows down cell proliferation resulting in low cell counts.

The bioreactor in the patent application overcomes ultraviolet radiation from the sun with a dark coating that keeps out ultraviolet radiation from sunlight. The coating protects the storage chamber and the fermentation chamber. An additional coating is applied on the dark coating. The objective of this special coating is to reflect heat. The coating is made up of a special polymer that reflects heat such as coatings used on house roofs to keep them cool. One example of such product is Sta-kool from Gardner. In order to manufacture the coating for the bioreactor, a microscopic sphere material is mixed with the mentioned roof coating. The microscopic spheres are made up of material with high heat resistance such as borosilicate microspheres manufactured by 3M. The heat-reflecting coating protects the storage chamber, the fermenter chamber and the box containing the electronics. This heat-reflecting technology is not common knowledge nor obvious in the manufacture of bioreactors nor in the art of bioremediation. As an additional feature, a portable air conditioner can be used to provide additional protection high temperature. During excessive hot weather, the air conditioner provides cool air into the control box to protect electronics. The cool air exits via a tube into a double wall of the feed chamber that stores the microorganisms or into a cooling jacket wrapped around the chamber. This prevents high heat in the storage chamber and allows the feeding microorganisms to maintain an extended shelf life. The air exits the double wall into the inlet port of the air pump that aerates the fermentation chamber. This allows cool air into the fermentation chamber preventing it from overheating due to environmental heat. The size and power of the air conditioner depends on the size of the bioreactor system. Guidelines of the size and power needed can be provided by one of various air conditioning systems specialized in electronic systems such as Kooltronic from New Jersey. The air conditioner has a HEPA filter to prevent unwanted particles from entering the control box. An optional canopy on top of the bioreactor can also be used to provide additional protection from solar radiation.

Cold weather is normally overcome with the use of a heater. However, if the weather is very cold and there is not enough heating capacity, the fermentation media does not achieve optimum temperature. This is especially true when the environment temperature is near freezing or below it. Cold air enters the chamber during aeration of the fermentation media and often may overcome the heating capacity of the heating element. The patent application uses a heater with high heat capacity. Over engineering of this element allows the fermentation chamber to be used in very cold environments. Because the heating element is set to a specific temperature, there is no danger of overheating the media. It is important for the bioreactor to work at its optimum and provide high enough cell counts during application. This is specially true if the environment is cold where the application takes place. The reason for this is that cold weather reduces biological activity dramatically. In order degrade contaminants in spite of to the lower biological activity cause by the cold weather in the environment, high cell counts need to be applied from the bioreactor.

The patent application also describes an auger system that feeds the fermenter from the storage chamber. The auger allows the use of concentrated cultures and nutrients in the storage chamber. This feature minimize the overall space requirements of the bioreactor. Powder, pellets, tablets or granules can be used. The auger system can be used in many configurations. In one configuration, the auger system is used in a vertical configuration (FIG. 2). In another configuration, the auger system can be hanging above the fermentation chamber (FIG. 3), Although there are other possible configurations, the two configurations described minimize the amount of space required for the bioreactor. When space is not an issue, liquid or gel bacteria and nutrients can be used with a low shear pump to feed the fermentation chamber. The low shear pump protects the microorganisms fed into the fermentation chamber to avoid rupturing cells due to shear stress.

The patent application also describes a special bacterial air filter with pore size of 0.2 microns made of surgical fabric from Kimberly-Clark. The material can be cut to the desired size and shape. It is autoclavable and strong enough to withstand the pressure from the air pump. The surgical fabric is very economical and easy to replace during maintenance of the bioreactor.

The diffuser in the patent application is made of a flexible diffuser hose. The diffuser can be built into any shape to accommodate any fermenter chamber shape. By bending the diffuser into the necessary shape, it ensures that all the fermentation broth is exposed to air. The gentle agitation and mixing provided with the small bubbles makes it unnecessary to use pumps for mixing which could also cause shear stress on cells.

BRIEF DESCRIPTION OF THE DRAWINGS

FIG. 4 Table with Data Showing the Effect of the Heat-reflective Coating.

DETAILED DESCRIPTION

The apparatus and methods of the patent application allow the treatment of wastes, wastewater and contaminated bodies of water using an on-site bioreactor to grow bioaugmentation microorganisms. The microorganisms digest contaminants through digestion. The microorganisms used are non-pathogenic bacteria, fungi or actinomycetes known in the art of bioremediation of contaminated environments. Microorganisms used in bioremediation have the ability to digest many different contaminants including, but not limited to, sludge, fats, oil, grease, odor producing compounds, hydrogen sulfide, mercaptans, volatile organic acids, ammonia, nitrites, nitrates, phosphorous, heavy metals, toxic organic substances and EPA Contaminant Candidates. Many microorganisms used also have the ability to interfere with the reproduction of pathogens, mosquitos and flies.

Figure 2:
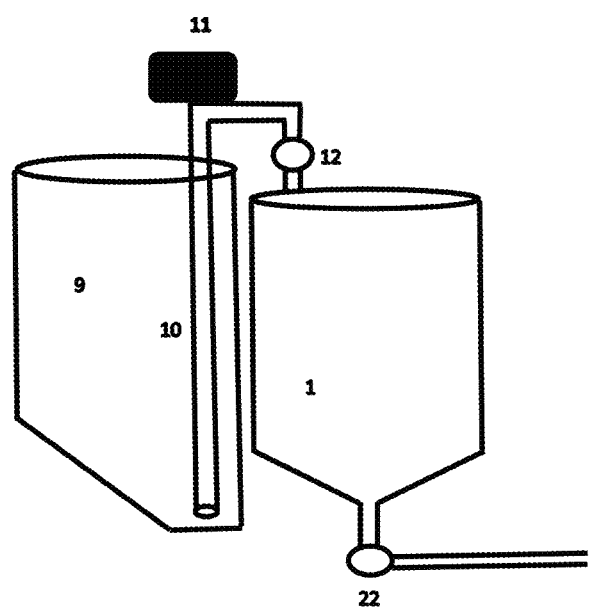
Figure 3:
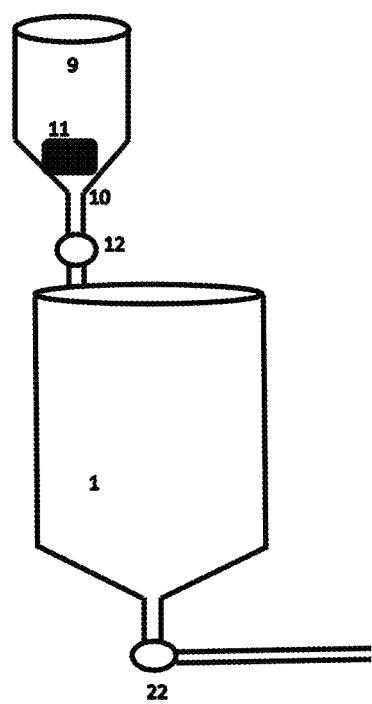

The environments where the bioreactor would apply the microorganism for bioremediation comprise of wastewater treatment plants such as aerated lagoons, facultative lagoons, anaerobic lagoons, contaminated ocean, oil spills, sludge lagoons or sludge ponds, activated sludge, oxidative ditches, sequential batch reactors, biological contactors, trickling filters, fixed bed reactors, fluidized bed reactors, sewer systems, aerobic digesters and anaerobic digesters. In addition, the environment containing wastes can also be contaminated water bodies such as lakes, lagoons, ponds, rivers, aquaculture systems and ground water. They can also be contaminated water bodies used for recreation, fishing or water reservoirs. Other potential environments are septic tanks, grease traps, contaminated soil, landfills, leachate or composting facilities where the microorganisms applied help speed up the composting process The on-site bioreactor described in the patent application is an outdoor apparatus that can be exposed directly to harsh environmental conditions that normally would be harmful for the microorganisms in the storage chamber (9, FIG. 1, FIG. 2 and FIG. 3), of the bioreactor and in the fermentation chamber (1, FIG. 1, FIG. 2 and FIG. 3). Excessive heat, cold and ultraviolet radiation makes it necessary for an on-site bioreactor to be in a building or in an enclosure for protection from harsh environments. Space is often limited at the optimum location where the microorganisms need to be applied. Often, space can not be taken in work areas without causing a safety hazard for workers. The bioreactor in the patent application does not need an enclosure for protection and has an option to use an auger system to utilize concentrated microorganisms and nutrients reducing further the space required.

Figure 1:
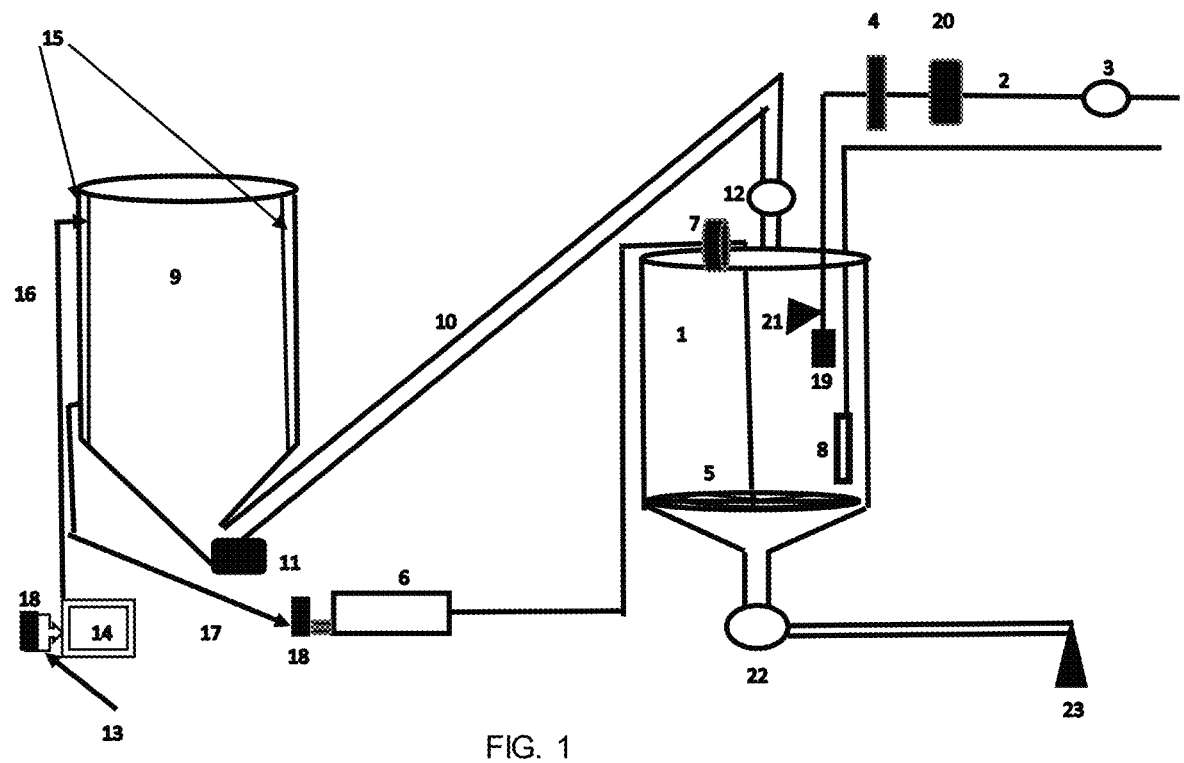
FIG. 1 Bioreactor with All Its Elements
FIG. 2 Bioreactor with Vertical Auger System Configuration
FIG. 3 Bioreactor with Hanging Storage Chamber and Hanging Auger System.

The bioreactor consists of a storage chamber (9, FIG. 1) for the microorganisms and nutrients and feeds them into a fermentation chamber (1, FIG. 1). In the fermentation chamber, the microorganisms multiply as much as 150 times the original number coming into the chamber. During fermentation, the microorganisms attain concentrations that range from $10^6$ cfu/ml to $10^{10}$ cfu/ml. The bioreactor can be used in a batch, semi-automatic and automatic embodiment. The batch and semi-automatic embodiment do not require the storage chamber. In the batch embodiment, an operator would turn on the bioreactor, fill the fermentation chamber with water and add a water soluble bag that contains the microorganisms and nutrients to the fermentation chamber. The operator would return after the fermentation cycle and drain the fermentation broth to apply the microorganisms into the contaminated waste, wastewater or contaminated body of water.

In the semi-automatic embodiment, a program in the control box of the bioreactor (14, FIG. 1) can automatically turn on and fill the fermentation chamber with water and turn on the heating element and the air pump. An operator would add a water soluble bag with the microorganisms and nutrients. The program in the control box would allow dosing the microorganism automatically at different times toward the end of the fermentation cycle. In this manner, the microorganism can be applied at different times during the day or night as needed even if the operator is not present.

The automatic embodiment would need a storage chamber for the microorganisms and the nutrients. The program in the control box would turn on the bioreactor heating and air pump elements; it would fill the fermentation chamber with water. Then it would apply the microorganisms and nutrients to begin fermentation. After a few hours of fermentation, the bioreactor would begin to dose the fermentation broth into the wastes, wastewater or contaminated body of water. The broth depleted during dosing would be replenished with the addition of more water to the fermentation chamber along with more microorganisms and nutrients. These additions would ensure a constant broth level in the fermentation chamber along with a high concentration of microorganisms.

The bioreactor can be powered by solar panels, gas-electrical generator, air turbines or an extension cord with the end enclosed in a water resistant enclosure such as NEMA 3 or 4 containing a GFCI (ground fault circuit interrupter) protector. The control box uses a programmable system to control the different elements of the bioreactor.

The programmable system can be purchased from various manufacturers in the USA including Phenix controls in Santa Ana, Calif.

The microorganism can be bacteria, fungi or actinomycetes known in the art of bioremediation. Species of Bacillus, Pseudomonas, Rhodobacter, Rhodospirillum, Thiobacillus, Nitrosomonas, Nitrobacter, Streptococcus, Aspergillus are just some that are commonly used. The nutrients can be inorganic and organic. Some examples of inorganic nutrients are potassium phosphates, sodium phosphates, ammonium phosphates, ammonium chloride, ammonium sulfate, magnesium chloride, magnesium sulfate, ferrous sulfate and ferric chloride. Some examples of organic nutrients are various protein or carbohydrate sources such as gelatin, casein, yeast extract, beef extract, molasses, sucrose, dextrose and others known in the art of bioremediation.

The organic nutrients can also be of a composition similar to the composition of the contaminants that the microorganisms are intended to degrade. For example, if the purpose of the use of the bioreactor is to degrade fats, oil and grease in the contaminated environment, then the nutrients in the storage chamber can contain similar composition to condition the microorganisms during fermentation so that when they are applied to the environment they are already producing the necessary enzymes to degrade the contaminants. The microorganisms can also be selected based on their ability to flourish under the specific conditions of the environment where they will be applied. Often, the environment that needs to be bioremediated has conditions that are not ideal for most microorganisms such as low pH, high pH, high salinity, low or no dissolved oxygen, too high or low temperature, low nutrient levels, or the presence of contaminants that are toxic to microorganisms. Selection of the right microorganisms to be used in an environment with adverse conditions may require pre-selection of the microorganism in the lab under similar adverse conditions as the environment where they will be applied.

FIG. 1 shows the embodiment of the automatic bioreactor with all its elements. The storage chamber 9 holds the microorganisms and nutrients. The bioreactor has an optional portable air conditioning system 13 (FIG. 1) preset at a temperature between 50° F. to 90° F. and more preferably 65° F. to 80° F. The purpose of the air conditioner is to avoid excessive heat during hot weather. High temperature can cause electronic controls to malfunction. It can also kill microorganisms in the storage chamber and hinder the growth of microorganisms in the fermentation chamber. The preferred configuration of the air conditioning system is for the cool air to enter the electronic control box 14 (FIG. 1) and exit through an insulated pipe 16 (FIG. 1) into the double wall of the feed chamber or a cooling jacket wrapped around it 15 (FIG. 1) to cool its contents. This extends the shelf-life of the microorganisms in the storage chamber 9 (FIG. 1) because many species used in the art of bioremediation lose viable cell counts significantly when exposed to environmental heat. The cool air exits the double wall or cooling jacket of the storage chamber at the point where the inlet 17 (FIG. 1) of the air pump 6 (FIG. 1) takes air to the diffuser 5 (FIG. 1) inside the fermentation chamber (1, FIG. 1). This cool air aids in preventing the fermentation chamber from overheating in hot weather which would cause low cell counts. The air conditioning system can be purchased from Kooltronic in Pennington, N.J.

The air conditioning unit has a dust or a HEPA filter (18 FIG. 1) to prevent dust from entering the control box (14, FIG. 1). A similar dust or HEPA filter (18, FIG. 1) is used for the air pump (6, FIG. 1) which feeds air into the fermentation chamber. This prevents dust particles from clogging the biological filter (7, FIG. 1). The biological filter is made of surgical cloth with pore size of 0.2 microns or less to prevent fungi, bacteria and spores from entering and contaminating the fermentation culture through the air supply.

The storage chamber 9 feeds the microorganisms and the nutrients into the fermentation chamber 1. The microorganisms and the nutrients can be stored and fed in the form of liquid, gel, pellets, granules, flakes, tablets or powder. To reduce the space requirement of the bioreactor, the preferred storage of microorganisms and nutrients is in concentrated pellets, flakes, granules, tablets or powder. In order to feed these concentrated blend of microorganisms and nutrients, a motor (11, FIG. 1) pushes the blend through an auger system (10, FIG. 1) to feed the fermentation chamber 1. The outlet of the auger system has an actuator valve (12, FIG. 1) that is normally closed. The actuator valve opens seconds before microorganisms and nutrients are fed to the fermentation chamber. Seconds after the auger system stops, the actuator valve closes. This avoids humidity from the fermentation chamber to enter into the storage chamber containing the microorganism and the nutrients. If humidity enters the storage chamber, the microorganisms may begin to reproduce themselves prematurely in the storage chamber.

Water can be fed into the fermentation chamber 1 directly from a water pipe (2, FIG. 1) with a solenoid or actuator valve (3, FIG. 1) controlled by the control box 14. The valve is opened when prompted by a program in the control box 14. The valve shuts off when a switch level (19, FIG. 1) attains a pre-determined level in the fermentation chamber or, alternatively, a water metering device can be used to apply a predetermined amount of water.

The fermentation chamber could also be filled from a reservoir tank or body of water. In both cases, an activated charcoal filter (4, FIG. 1) precedes the fermentation chamber to neutralize chlorine or other oxidizers that may be present in the water. In order to prevent pathogens from entering the fermentation chamber with the water, a disinfecting ultraviolet unit (20, FIG. 1) can be placed on line just before the fermentation chamber. Water enters the fermentation chamber through a spray nozzle or spray bar (21, FIG. 1) to rinse the inner walls of the fermentation chamber when the chamber fills with water. Rinsing is often necessary to wash away deposits of nutrients and of microorganisms that build up at the operating water level of the fermentation chamber. Rinsing can be done as the fermentation chamber fills with water or as an additional step when the fermentation chamber is empty to fully clean it and drain the deposits. These deposits contain beneficial microorganisms and are also beneficial to the contaminated environment where they are applied The fermentation chamber can be made of plastic such as HDPE or other material that has low heat conductivity in case the environmental temperature is too high or low. In this manner, the impact of temperature from the environment is reduced so that the microorganisms can grow at their optimum temperature in the fermenter and produce high cell counts. The fermentation chamber is kept at a fixed temperature by the heating element (8, FIG. 1). Air is provided to the fermentation chamber by air pump 6 via a fine-bubble air diffuser made up of a flexible micropore hose (5, FIG. 1). The diffuser hose is made of a thermoset polymer with fine pores ranging in size from 50 to 500 microns. The small size of the pores produce air bubbles approximately 3 mm in diameter. The small bubbles provide high surface area to enhance oxygen exchange between the air bubbles and the fermentation broth. The flexibility of the porous hose allows it to be bent in any configuration and be placed at the bottom of the fermentation chamber or a point near halfway. In both cases, the bubbles provide oxygen while their buoyancy provides full mixing of the fermentation broth. This facilitates contact with the microorganisms and their nutrients for optimal growth. This method of mixing the contents of the fermentation broth is gentle and free of shear stress. This is important because shear stress causes rupture of cell membranes reducing cell counts. The flexible porous diffuser hose and diffusers made of such porous hose are available from various suppliers in the USA. Most of these models resemble what has been disclosed in U.S. Pat. No. 5,811,164, issued Sep. 22, 1998 to Mitchell entitled "AERATION PIPE AND METHOD OF MAKING SAME", which is incorporated herein by reference in its entirety.

The pump is able to provide air from 10% to 400% of the volume of the fermentation broth per minute. That is, a 100-liter fermentation chamber can have 10 to 400 liters of air pumped through the diffuser per minute to ensure that enough oxygen enters the chamber. As alternative to air, pure oxygen can be applied if desired. Biofiltration is provided to prevent pathogens from entering the fermentation chamber via the air supplied by the air pump or oxygen source.

A biological filter (7, FIG. 1) is placed between the air pump and the diffuser. The air filtration element is made up of surgical fabric held in place by any means that allow it to maintain a seal while the air goes through it. One way to keep the surgical fabric in place is to use a clamped connector or a screwable PVC connector union. One or two layers of the surgical fabric can be used if needed. The fabric is strong and resists the air pressure from the air pump. The surgical fabric has a pore size of 0.2 microns or less which prevents fungi, bacteria and spores from entering and contaminating the fermentation culture through the air supply. The fabric can be cut to the needed size and shape. Several pieces can be autoclaved at the same time. They can be brought to the on-site bioreactor in sterilized autoclaved bags. Each fabric bio-filter can be used through several cycles of the bioreactor before it needs to be replaced. The surgical fabric is disposable, very economical and easy to replace unlike standard biological air filtration systems. The cost of the surgical fiber filter is several orders of magnitude lower than standard biological filters which need to be autoclaved and eventually disposed after a few uses. The surgical fabric is available from Kimberly-Clark.

The fermentation chamber is heated with a controlled submersible heating element (8, FIG. 1) with sufficient wattage to allow it to maintain temperature even when the outside environment is very cold and even under the freezing point of water. Microorganisms reproduce themselves very slowly in cold temperature (ex. under 59 F) causing low cell counts. The heating element can be set to a specific temperature mechanically or digitally. The temperature range in the fermentation chamber can be kept between 60 F and 120 F. The specific temperature set depends on the microorganisms being grown. The wattage of the heating element can range from 2 watts per gallon of the fermenting broth to 50 watts per gallon. The higher wattage and overcapacity of the heating element is preferred to ensure that the chamber temperature is maintained because the air pump would bring in cold air in very cold or freezing weather.

The fermentation broth is delivered to the wastes, wastewater or contaminated body of water via a low-shear pump, a solenoid or an actuator valve (22, FIG. 1). The system can be emptied all at once or in different portions throughout the day depending on the program in the control box. In very cold environments, the heating element (8, FIG. 1) can be turned off via the electronic control system a few minutes before the fermentation broth is applied to the environment. In this manner, the microorganisms adjust to the temperature of the environment before they are applied without suffering a temperature shock. After applying the broth to the contaminated environment, heating can continue in the fermentation chamber if broth remains in it. In a different embodiment of the apparatus, the broth can exit into the contaminated environment via spray head system (23, FIG. 1). This is useful when the product is applied to the sewer at a lift station, manhole or wet well. The spray head system allows covering a large area of application to keep equipment, sensors and the walls from building up fat, oil, grease, and other biodegradable debris. Additionally, this application prevents mats of fat, oil, grease, paper and other debris from building up in the wet well, lift stations and manholes.

Auger systems are normally in an angle (10, FIG. 1). In a different embodiment, the auger system can be used in a vertical manner (10, FIG. 2). By moving the microorganisms and nutrients vertically from the storage chamber (9, FIG. 2), the space required by the auger system is minimized. In this particular embodiment, the auger motor (11, FIG. 2) is on top. The actuator valve (12, FIG. 2) opens just a few seconds before the auger system feeds microorganisms and nutrients to the fermentation chamber (1, FIG. 2) and it closes seconds after the auger system stops. The purpose of the actuator valve is to remain close when the fermentation chamber is not being fed to prevent humidity from entering into the storage chamber via the auger system. An actuator valve (22, FIG. 2) feeds the microorganisms from the fermentation chamber into the contaminated waste, wastewater or body of water.

On a different embodiment, the storage chamber (9, FIG. 3) and the auger system (10, FIG. 3) can be on top of the Fermentation Chamber (1, FIG. 3). This configuration also reduces the space requirement of the bioreactor. The auger motor (11, FIG. 3), is inside or on top of the fermentation chamber. An actuator valve (12, FIG. 3) is used to prevent humidity into the storage chamber and another actuator valve (22, FIG. 3) delivers the microorganisms from the fermentation chamber into the environment.

The storage chamber and the fermentation chamber are painted with a black coat to protect them from ultraviolet radiation from sunlight. A second outer, coating provides heat-reflective protection from sunlight. The coating is made of a heat reflecting polymer paint used on roofs to keep houses cool and a special microsphere material. The heat reflective polymer paint can be purchased from Sta-kool from Gardner. The microscopic sphere material that is mixed with the heat reflective paint provides additional heat reflective properties. The microscopic spheres are made up of material with high heat capacity such as borosilicate microspheres manufactured by 3M. The heat reflective coating is not common knowledge nor obvious in the manufacture of bioreactors nor in the art of bioremediation.

FIG. 4 shows test results with the heat reflective coating. Two identical tanks made of HDPE were evaluated. One tank had coating and the other did not. Both tanks were exposed to direct sunlight, at the same time, for two hours during noon time in the summer. Three calibrated thermometers were used. Each sat on an eight-inch tall piece of wood to provide insulation from the heat of the floor. One thermometer was exposed to direct sunlight, another was inside the tank with no coating and the third thermometer was inside the tank with heat reflective coating. The tank with coating was 24 F cooler than the tank with no coating.

The bioreactor system has an optional canopy attached to the platform where the bioreactor system is placed. Such platform can be a pallet or small platform because the system is compact and portable. The pallet is made of wood, plastic or any material with low heat conductivity. The canopy provides additional protection from heat of the sun and ultraviolet radiation. The canopy system is of a design and shape that provides flow of wind for cooling and prevents excessive air pressure on the canopy in environments with strong winds. The color of the canopy can be a light color that reflects heat or it can be coated with the same type of heat-reflective coating used to coat the storage chamber and the fermentation chamber.

Although the apparatus and methods described in the patent application have been particularly shown and described with reference to preferred embodiments, it will be understood by those skilled in the art that changes in form and detail may be made therein without departing from the spirit and scope of the invention.

We claim:

1. An outdoor apparatus for growing and delivering biosafety-level-one bacterial, fungal or actinomyces cultures to wastewater comprising:
   a coated double-wall storage chamber for containing microorganisms, said coating for protection against heat and ultraviolent radiation;
   a coated fermentation chamber, said coating for protection against heat and ultraviolent radiation;
   a delivery system to provide nutrients and microorganisms from said storage chamber to said fermentation chamber including a low shear pump or an auger for delivery of microorganisms and nutrients or nutrients;
   an optional canopy for covering the apparatus from weather conditions;
   an air pump to provide oxygen and aeration to said fermentation chamber;
   a heater for maintaining the temperature of said fermentation chamber;
   a bacterial air fabric filter and flexible microporous hose air diffuser disposed within said fermentation chamber to provide aeration and agitation;
   an optional air conditioner for cooling said apparatus;
   a programmable controller for controlling the delivery nutrients and microorganisms selected based on the wastes being treated;
   a low shear pump in operative connection with a solenoid vale or actuator valve for delivering and dosing fermentation broth from said fermentation chamber to said wastewater; and
   a water supply system to provide water to said fermentation chamber and for rinsing and cleaning said fermentation chamber.

2. The outdoor apparatus for growing a delivering biosafety-level-one bacterial, fungal or actinomyces cultures to wastewater as in claim 1, wherein said nutrients are bioremediation inorganic or organic compounds.

3. The outdoor apparatus for growing a delivering biosafety-level-one bacterial, fungal or actinomyces cultures to wastewater as in claim 2, wherein said bioremediation inorganic nutrients are selected from the group consisting of potassium phosphates, sodium phosphates, ammonium phosphates, ammonium chloride, ammonium sulfate, magnesium chloride, magnesium sulfate, ferrous sulfate and ferric chloride.

4. The outdoor apparatus for growing a delivering biosafety-level-one bacterial, fungal or actinomyces cultures to wastewater as in claim 2, wherein said bioremediation organic nutrients are selected from the group consisting of proteins, carbohydrates, gelatin, casein, yeast extract, beef extract, molasses, sucrose, dextrose and mixtures thereof.

5. The outdoor apparatus for growing a delivering biosafety-level-one bacterial, fungal or actinomyces cultures to wastewater as in claim 1, wherein said microorganism delivered to said fermentation chamber is selected from the group consisting of bacteria, fungi, actinomyces and biosafety-level one microbes.

6. The outdoor apparatus for growing and delivering biosafety-level-one bacterial, fungal or actinomyces cultures to wastewater as in claim 1, wherein said programmable controller controls delivery of nutrients, microorganisms, temperature, oxygen to said fermentation chamber with the organisms selected based on the wastewater conditions.

7. The outdoor apparatus for growing a delivering biosafety-level-one bacterial, fungal or actinomyces cultures to wastewater as in claim 1, wherein said microorganisms delivered to said fermentation chamber in a concentration range from $10^6$ to $10^{10}$ cfu/ml.

* * * * *